United States Patent

[11] 3,530,938

| [72] | Inventor | James E. Cooper |
| | | Dallas, Texas |
| [21] | Appl. No. | 785,733 |
| [22] | Filed | Dec. 20, 1968 |
| [45] | Patented | Sept. 29, 1970 |
| [73] | Assignee | Mobil Oil Corporation |
| | | a corporation of New York |

[54] OIL RECOVERY PROCESS UTILIZING A THICKENED AQUEOUS FLOODING MEDIUM
10 Claims, No Drawings

[52] U.S. Cl. ...................................... 166/273, 166/274
[51] Int. Cl. ...................................... E21b 43/22
[50] Field of Search ........................... 166/273— 275, 270, 268; 252/8.55 D, B; 260/47, 48

[56] References Cited
UNITED STATES PATENTS

| 3,308,883 | 3/1967 | Foster | 166/275 |
| 3,330,343 | 7/1967 | Tosch et al. | 166/273 |
| 3,373,810 | 3/1968 | Williams | 166/275X |
| 3,398,094 | 8/1968 | Blatz et al. | 166/275X |

*Primary Examiner*—Stephen J. Novosad
*Attorneys*—William J. Scherback, Frederick E. Dumoulin, William D. Jackson, Andrew L. Gaboriault and Sidney A. Johnson ABSTRACT: This specification discloses a method of recovering oil employing an aqueous flooding medium containing a sulfonated poly(2-R-6-R'-1,4-phenylene oxide) wherein R is hydrogen or an aliphatic group containing from 1 to 3 carbon atoms and R' is an aliphatic group containing from 14 to 20 carbon atoms with at least 14 carbon atoms in a straight chain. The aqueous solution of the sulfonated polymer exhibits the property of undergoing an increase in viscosity with an increase in salt concentration. The aqueous flooding medium may contain a salt, or an aqueous solution of a salt may be injected prior to or subsequent to the flooding medium.

OIL RECOVERY PROCESS UTILIZING A THICKENED AQUEOUS FLOODING MEDIUM

BACKGROUND OF THE INVENTION

This invention relates to the recovery of oil from subterranean formations and, more particularly, to new and improved secondary recovery operations utilizing thickened aqueous flooding mediums.

In the recovery of oil from oil-bearing reservoirs it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques, which are commonly referred to as secondary recovery operations although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid such as fresh water or brine, an oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which often is encountered in secondary recovery operations is the relatively poor sweep efficiency of the injected displacing liquid. That is, the displacing liquid exhibits a tendency to channel through certain portions of the reservoir and to bypass other portions. Such poor sweep efficiency is occasioned by differences between the viscosity of the injected displacing medium and the in-situ reservoir oil and also by permeability variations within the reservoir.

Various techniques have been proposed in order to improve the sweep efficiency of an injected displacing fluid. One promising procedure involves the utilization of a relatively viscous displacing liquid. Thus, in waterflooding operations thickening agents have been added to at least a portion of the flood water in order to increase the viscosity thereof. The viscosity of the displacing liquid may be increased prior to its injection into the reservoir. Alternatively, the viscosity of the flooding medium may be increased in situ in order to avoid a reduction in injectivity at the injection wells. Thus, as disclosed in U.S. Pat. No. 3,208,518 to John T. Patton there is disclosed a waterflooding process wherein the viscosity of the aqueous flooding medium is increased in situ through the use of high molecular weight ionic polymers under controlled pH conditions. Another highly promising waterflooding procedure is disclosed in US. Pat. No. 3,308,883 to William R. Foster. In this procedure the flood water contains as a thickening agent a sulfonated poly (2,6-dialkyl phenylene oxide) in which the alkyl groups are methyl, ethyl, or normal propyl groups. As disclosed in this patent, the addition of the polymer to flooding water causes a highly desirable increase in viscosity although the viscosifying effect of the polymer is decreased by the presence of salt.

SUMMARY OF THE INVENTION

In accordance with the present invention, there is provided a new and improved oil recovery process employing a thickened aqueous flooding medium which not only is not subject to viscosity degradation in the presence of salt, but undergoes an increase in viscosity with an increase in salt concentration. The invention is practiced in a subterranean oil reservoir penetrated by spaced injection and production systems which define a recovery zone within the reservoir. In carrying out the invention, an aqueous flooding medium is injected into the recovery zone of the reservoir via the injection system. The aqueous flooding medium contains a sulfonated poly (2-R-6-R'-1,4-phenylene oxide) wherein R is hydrogen or an aliphatic group containing from 1 to 3 carbon atoms and R' is an aliphatic group having from 14 to 20 carbon atoms with at least 14 carbon atoms in a straight chain. Thereafter, a suitable driving fluid is injected into the recovery zone in order to displace the aqueous flooding medium toward the production system and oil is recovered from the reservoir via the production system.

In a preferred embodiment of the invention, an aqueous solution of a salt is employed in conjunction with the aforementioned flooding medium. Thus, the aqueous flooding medium containing the sulfonated polymer may also contain a salt, or an aqueous salt solution may be injected prior to or subsequent to the aqueous flooding medium.

DESCRIPTION OF SPECIFIC EMBODIMENTS

The present invention is carried out in a recovery zone of a subterranean oil-bearing reservoir. As will be understood by those skilled in the art, by the term "recovery zone", as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone as defined by the spaced rows of injection and production wells generally will be that portion of the reservoir underlying the area between these spaced rows. Exemplary of other patterns which may be used are the so-called "circular flood" patterns in which the injection system comprises a central injection well and the production system comprises a plurality of production wells spaced about the injection well. Of course, the injection and production systems each may consist of only a single well in which case the recovery zone as defined by the spaced injection and production wells will be the portion of the reservoir underlying a generally elliptical area between these wells which is subject to the displacing action of the injected flooding medium. The above and other patterns are well known to those skilled in the art and for a more detailed description of such patterns reference is made to Uren, L.C., Petroleum Production Engineering—Oil Field Exploitation, 2nd Ed., McGraw-Hill Book Company, Inc., New York and London, 1939, and more particularly to the section entitled "The Water Flooding Process", appearing at pages 444—459.

It also will be recognized that the invention may be carried out utilizing one or more dually completed injection-production wells of the type, for example, disclosed in U.S. Pat. No. 2,725,106 to Ralph Spearow. This arrangement may sometimes be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

In practicing the invention, an aqueous flooding medium containing the sulfonated poly (2- R-6- R'-1,4-phenylene oxide) is injected into the recovery zone of the reservoir and moved through the recovery zone in the direction of the production system. Oil is displaced from the reservoir by the flooding medium and recovered through the production system. The sulfonated poly (2- R-6- R'-1,4-phenylene oxide) is characterized by the following structural formula:

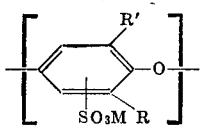

wherein:

R is hydrogen or an aliphatic group having from 1 to 3 carbon atoms,

R' is an aliphatic group having from 14 to 20 carbon atoms with at least 14 carbon atoms in a straight chain, and M is a cation such as hydrogen or another ion which will replace hydrogen and produce a water-soluble polymer. In most cases M will be either hydrogen, ammonium, or sodium. However, M may be any other suitable cation such as an alkali metal ion or an alkaline earth metal ion.

Aqueous solutions of sulfonated poly (2-R-6-R'-1,4-phenylene oxide) exhibit the surprising characteristic of undergoing an increase in viscosity with increasing salt concentration. This is, of course, contrary to the results experienced with the sulfonated poly phenylene oxides previously used in water-flooding as disclosed in the aforementioned patent to Foster. While the invention is not to be limited by any theory of operation, it is postulated that this viscosity increase in the presence of salt is due to association of the long-chain substituent groups with one another. The sulfonate groups, in either acid or salt form, become ionized in aqueous solution and acquire negative charges which tend to repel one another and their respective monomer units. By increasing the salt concentration of the solution, the effect of the negatively charged sulfonate groups is masked to some extent, thus allowing the monomeric units and their respective long-chain substituents to become more closely associated with one another.

The phenomenon of increasing viscosity with increasing salt concentration is exhibited for polymers with substituent groups having at least 14 carbon atoms in a straight chain. In laboratory tests carried out with regard to the invention, the viscosity responses of aqueous solutions of sulfonated poly (2-R-6- R'-1,4-phenylene oxides) to increasing salt concentration were measured. For polymers in which the aliphatic substituent R' was n-octyl, n-decyl, or n-dodecyl, the viscosity decreased with increasing salt concentration. However, for a polymer in which the aliphatic substituent R' was a n-tetradecyl group, the aqueous solution of this polymer exhibited an increase in viscosity with increasing salt concentration.

The solubility of the polymer in water decreases as the chain length of R' increases and therefore the long-chain substituent group should not contain more than 20 carbon atoms. Preferably, the substituent group R contains 14 carbon atoms since as noted above this is sufficient to impart the desired characteristic of viscosity increase with an increase in salt concentration. The water solubility of the polymer also increases with the degree of sulfonation similarly as with the sulfonated poly phenylene oxides disclosed in the aforementioned patent to Foster. While the likelihood of sulfone crosslinking increases with the degree of sulfonation, 90 to 100 percent sulfonation can be achieved with little or no crosslinking.

The viscosity of an aqueous solution of the polymer varies with polymer concentration and molecular weight as well as with salt concentration. Thus, at a given salt concentration an increase in polymer concentration or molecular weight will result in an increase in viscosity.

As an illustrative example of the effect of salt concentration on the viscosity of an aqueous flooding medium employed in accordance with the present invention, reference is made to the following tests. Sodium chloride was employed as the salt in the tests. The polymer employed was sulfonated poly (2-methyl-6-tetradecyl-1,4-phenylene oxide) (sodium form). This polymer was of a relatively low molecular weight, the parent polymer before sulfonation exhibiting an intrinsic viscosity of only 0.116 deciliter per gram in carbon tetrachloride at 25°C. Viscosity measurements on carbon tetrachloride solutions of unsulfonated polymer were carried out using a Ubbelohde dilution capillary viscometer. Viscosity measurements on aqueous solutions of sulfonated polymer were carried out using a Brookfield concentric cylinder viscometer.

In a first test the effect of salt on the viscosity of a 2 percent by weight solution of the polymer was measured. In distilled water the polymer exhibited a viscosity of 1.6 centipoises at 3 r.p.m. of the viscometer. At a salt concentration of 0.25 normality, the viscosity of the solution remained at 1.6 centipoises and thereafter underwent a gradual increase in viscosity with an increase in salt concentration up to a concentration of 0.45 normality. Upon further increasing the salt concentration to a normality of 0.60, the viscosity of the solution increased sharply to a value of 1566 centipoises at 0.3 r.p.m. and upon increasing the salt concentration to 0.75 normality, the solution gelled. By reducing the polymer concentration to 1.75 percent by weight, the viscosity of the solution at 0.3 r.p.m. and a salt concentration of 0.60 normality was 1016 centipoises. For a polymer concentration of 1.50 percent by weight, the viscosity of the solution was 36 centipoises at the same r.p.m. and salt concentration.

While the substituent group R may be hydrogen or a saturated or unsaturated aliphatic group, it is preferred that R be an alkyl group from the standpoint of ease of synthesis of the monomer from which the polymer is prepared. Preferably, R is a methyl group in view of this consideration and also from the viewpoint of economy. Similarly, the substituent group R' preferably is an alkyl group from the viewpoint of synthesis of the monomer from which the polymer is prepared. Thus, in a preferred embodiment of the invention, the polymer employed is sulfonated poly (2-methyl-6-tetradecyl-1,4-phenylene oxide).

The significance of the advantages derived from the present invention can be readily appreciated when it is considered that most oil-bearing formations contain brine. Such brines, usually present as a connate water, may contain salts in concentrations of up to 3 to 5 percent and in some instances greater than 10 percent. Thus, the practice of the present invention in which the thickened aqueous medium does not undergo a viscosity reduction in the presence of salt is particularly advantageous.

In a further aspect of the invention an aqueous salt solution is injected into the reservoir in conjunction with the flooding medium containing the sulfonated polymer. If desired, the salt may be injected in the solution with the polymer in the flooding medium. Also, in order to obtain an in-situ increase in viscosity, an aqueous solution of a salt may be injected into the reservoir prior to or subsequent to the aqeuous solution of polymer. Any salt which readily ionizes in aqueous solution and is not incompatible with the flooding medium or materials contained in the reservoir may be utilized in carrying out these embodiments of the invention. Exemplary of the salts which may be used are the ammonium halides, alkali metal halides, and alkaline earth metal halides. From the standpoint of economy and ready availability, it usually will be desirable to utilize sodium chloride in carrying out the invention.

The driving fluid injected subsequent to the aqueous solution of polymer may be any suitable displacing medium such as those conventionally used in secondary recovery operations. Thus, the driving fluid may be thickened water, unthickened water, a gas, or alternate slugs of gas and water. Also, the driving fluid may take the form of an aqueous solution of the sulfonated poly (2-R-6- R'-1,4-phenylene oxide) or, stated otherwise, injection of the aqueous polymer solution may be continued throughout the recovery operation.

I claim:

1. In the recovery of oil from a subterranean oil reservoir penetrated by spaced injection and production systems defining a recovery zone within said reservoir, the method comprising:

introducing into said recovery zone via said injection system an aqueous flooding medium containing sulfonated poly- (2-R-6-R'-1,4-phenylene oxide) wherein R is hydrogen or an aliphatic group containing from 1 to 3 carbon atoms and R' is an aliphatic group containing from 14 to 20 carbon atoms with at least 14 carbon atoms in a straight chain;

introducing a driving fluid into said recovery zone via said injection system to displace said aqueous solution toward said production system; and recovering oil from said production system.

2. The method of claim 1 wherein R is a methyl group.

3. The method of claim 1 wherein R' contains 14 carbon atoms.

4. The method of claim 1 wherein said aqueous solution contains a salt.

5. The method of claim 1 further comprising the step of, prior to the introduction of said aqueous flooding medium, introducing an aqueous solution of a salt into said recovery zone via said injection system.

6. The method of claim 1 further comprising the step of, subsequent to the introduction of said aqueous flooding medium, introducing an aqueous solution of a salt into said recovery zone via said injection system.

7. The method of claim 1 wherein said aqueous flooding medium contains sulfonated poly (2-methyl-6-tetradecyl-1,4-phenylene oxide).

8. The method of claim 7 wherein said aqueous solution contains a salt.

9. The method of claim 7 further comprising the step of, prior to the introduction of said aqueous flooding medium, introducing an aqueous solution of a salt into said recovery zone via said injection system.

10. The method of claim 7 further comprising the step of, subsequent to the introduction of said aqueous flooding medium, introducing an aqueous solution of a salt into said recovery zone via said injection system.